INVENTOR.
JOHN P. RENSHAW

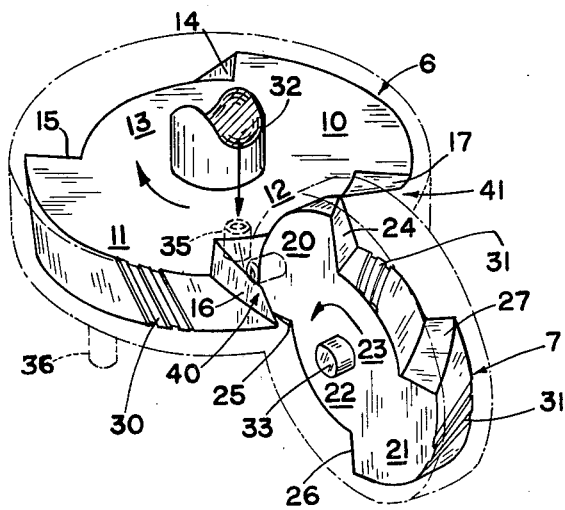
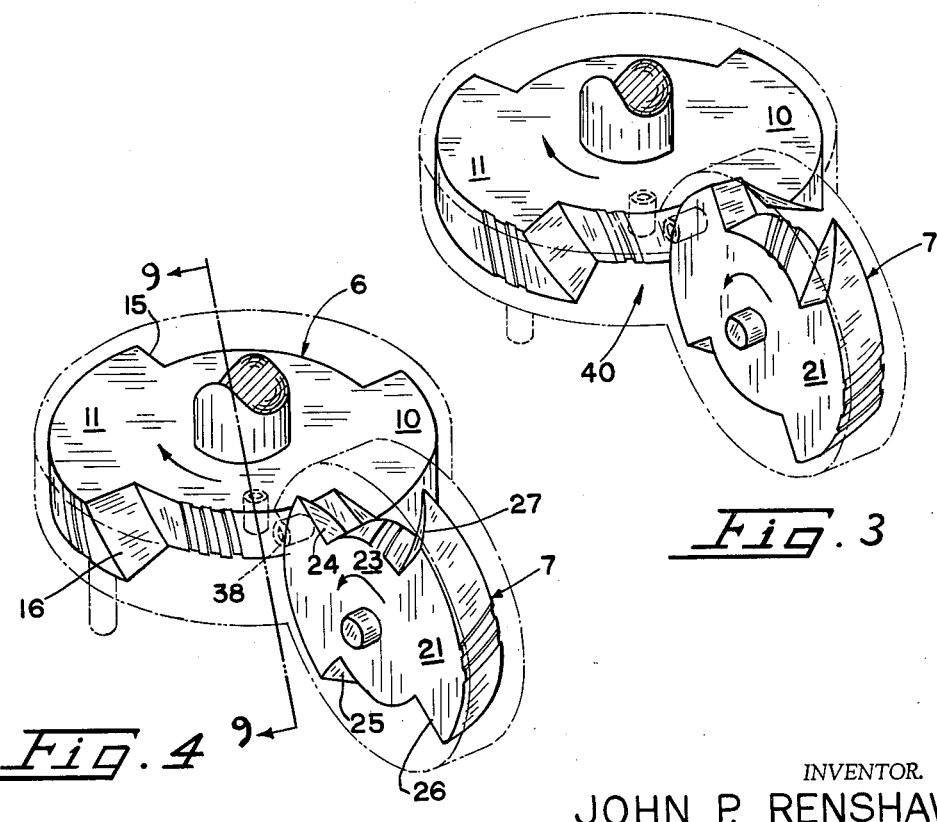
INVENTOR.
JOHN P. RENSHAW

Sept. 14, 1965 J. P. RENSHAW 3,205,874
ROTARY TYPE POSITIVE DISPLACEMENT
ENERGY CONVERTING DEVICE
Filed Jan. 17, 1962 6 Sheets-Sheet 3

INVENTOR.
JOHN P. RENSHAW

United States Patent Office 3,205,874
Patented Sept. 14, 1965

3,205,874
ROTARY TYPE POSITIVE DISPLACEMENT
ENERGY CONVERTING DEVICE
John P. Renshaw, 340 Pine St., San Francisco, Calif.
Filed Jan. 17, 1962, Ser. No. 166,791
6 Claims. (Cl. 123—13)

This invention relates to rotary type positive displacement energy converting devices such as fluid compressors and fluid motors. More specifically the invention relates to such devices in which compression and expansion chambers are provided between projections on a rotary power disk and one or more abutment disks which rotate in sealing engagement with the power disk and have recessed portions meshing with the projections on the power disk.

In the past such devices have been designed as internal combustion engines in which the abutment disks were employed to provide the compression cycle and delivered a compressed fuel mixture for ignition in the expansion chamber formed by the power disk. This type of internal combustion engine is described in detail in my United States Patent No. 3,012,551, issued December 12, 1961. In addition such devices have been designed in which the abutment disks do substantially no work in order to reduce the losses of the drive gearing between the power and abutment disks, as described in my copending application Serial No. 127,431, filed July 10, 1961.

In general the object of this invention is to increase the utility of such rotary type positive displacement devices by making greater use of the abutment disks.

More specifically an object of this invention is to provide a fluid motor of the type described in which a given size motor unit will deliver more power than previous motor units of the same size. The increase in power is accomplished by delivering high pressure fluid to the abutment disks as well as to the power disk.

Another object of the invention is to provide a fluid compressor of the type described in which a given size compressor unit will deliver a greater volume of fluid than previous compressor units of the same size. The increase in compressor delivery is accomplished by utilizing both the power disk and the abutment disks to compress fluid and deliver it to a point of use remote from the compressor unit. As explained in the preceding description, my United States Patent No. 3,012,551, issued December 12, 1961, does provide a device in which the abutment disks are employed to compress a fluid. However, that device is an internal combustion engine as distinguished from a compressor, and the fluid which is compressed by the abutment disks is delivered to the power disk as distinguished from delivery to a point of use remote from the device.

An additional object of the invention is to provide a power generating system of the type described which will deliver more power than similar previous systems of the same size. This object is accomplished by interconnecting the improved compressor and motor units of the invention so that the compressor unit delivers to a combustion chamber which supplies high pressure fluid to the motor unit. Previous similar systems, such as in my copending application Serial No. 127,431, do not employ the abutment disks either for compression or expansion service and therefore require larger units to deliver the same power as a system constructed according to this invention.

A further object of the invention is to provide a more efficient rotary type positive displacement device by reducing the power loss in the drive connection between the power and abutment disks. This feature of the invention is particularly beneficial in connection with devices of the type described in my United States Patent No. 3,012,551, issued December 12, 1961, wherein the power and abutment disks are interconnected by means of angle type gear teeth. Prior to this feature of the invention the abutment disks have been driven by the power disk by means of the gearing between the disks. According to the present invention the efficiency is increased by providing at least part of the driving force for the abutment disks in the form of fluid pressure acting directly on the abutment disks.

An additional object is to provide a fluid motor of the type described in which it is possible to employ the motor either for high power operation or for high efficiency operation by utilizing the abutment disks selectively as either working disks or idling disks, respectively. An associated object is to provide means for adjusting between high power and high efficiency during operation of the motor. These objects are achieved by means of a relatively simple valving system for selecting the appropriate fluid pressure source for the abutment disks.

A further object is to provide a fluid compressor of the type described in which it is possible to employ the compressor either for high output or for high efficiency. An associated object is to provide means for adjusting between high output and high efficiency during operation of the compressor. These objects are achieved by means of a relatively simple valving system for selecting the appropriate fluid pressure source for the abutment disks.

Other objects of the invention will become apparent upon reading the following specification and referring to the accompanying drawings in which similar characters of reference represent corresponding parts in each of the several views.

In the drawings:

FIGS. 2 through 4 are perspective views of the device of FIG. 1 with the casing shown only in dot-dash outline and showing only one of the abutment disks. The only difference among FIGS. 2–4 is that the rotational position of the disks has been moved in sequence from FIG. 2 to FIG. 4.

FIGS. 5 through 8 are the same as FIGS. 2–4 except that the entire device has been rotated clockwise to show the opposite side of the abutment disk. The only difference among FIGS. 5–8 is that the rotational position of the disks have been moved in sequence from FIG. 5 to FIG. 8.

Figure 1:
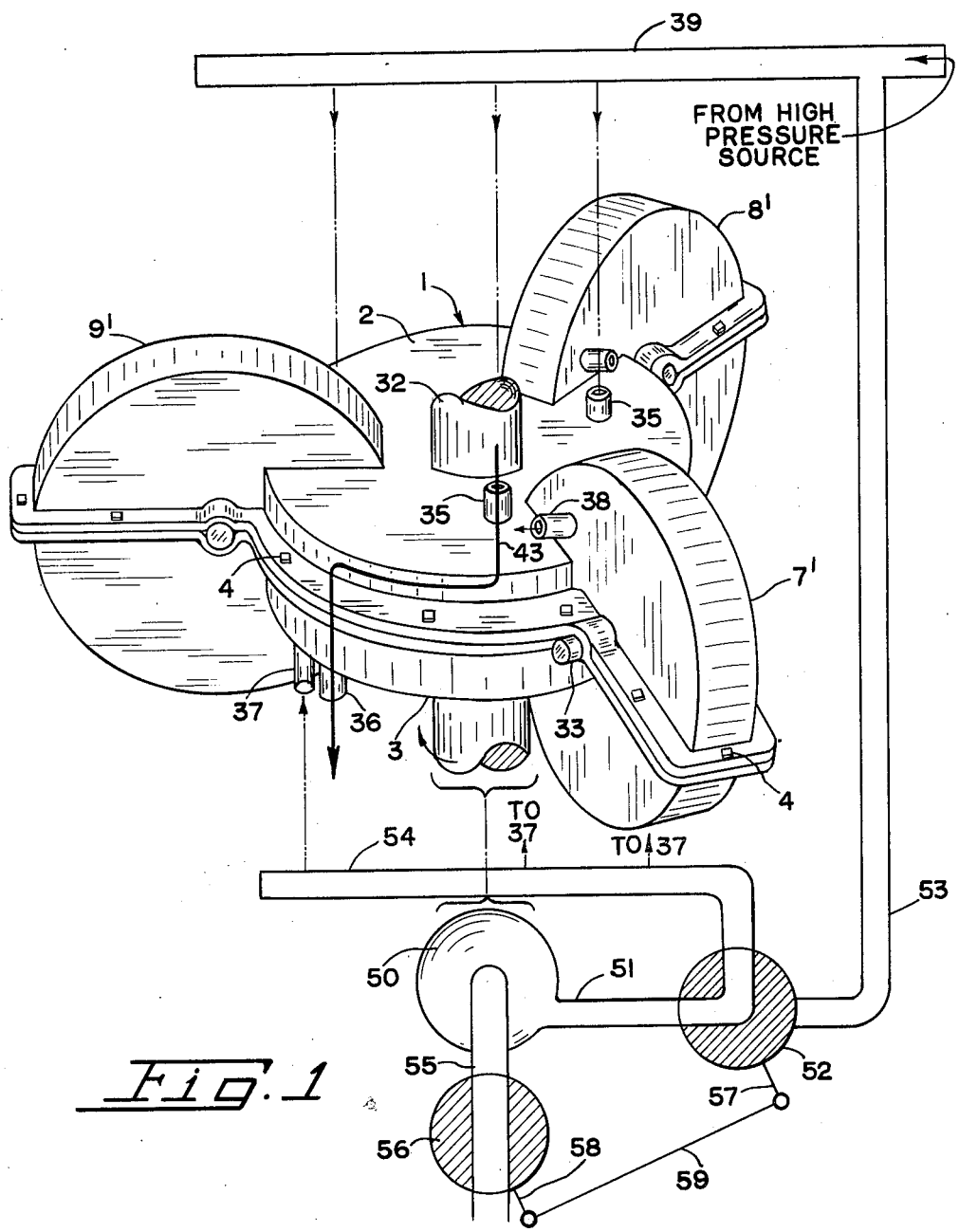
FIG. 1 is a perspective view of the outside of a positive displacement type energy converting device incorporating the invention and having three abutment disks. In addition FIG. 1 contains a schematic showing of a suitable dual fluid pressure source and selective valving arrangement for the abutment disks which can be employed when the device is used as a fluid motor.
Figure 5:
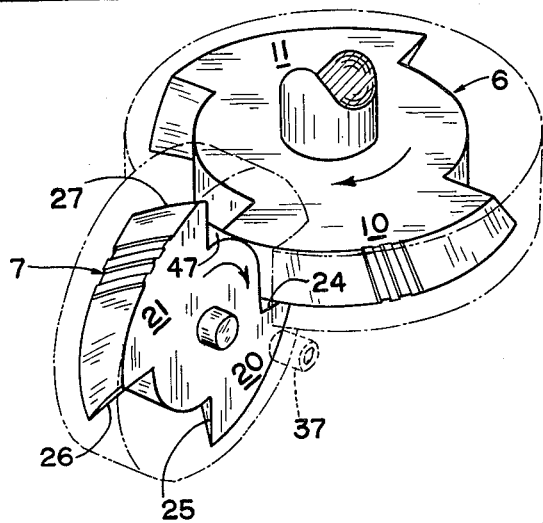
Figure 9:
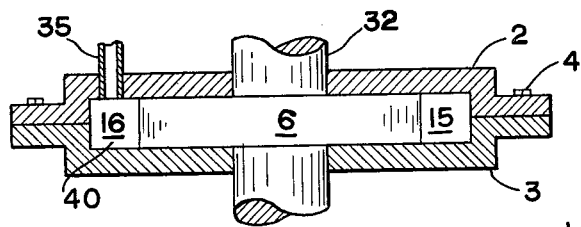
FIG. 9 is a cross-section view on line 9—9 of FIG. 4 but showing the casing in full lines as in FIG. 1.
Figure 10:
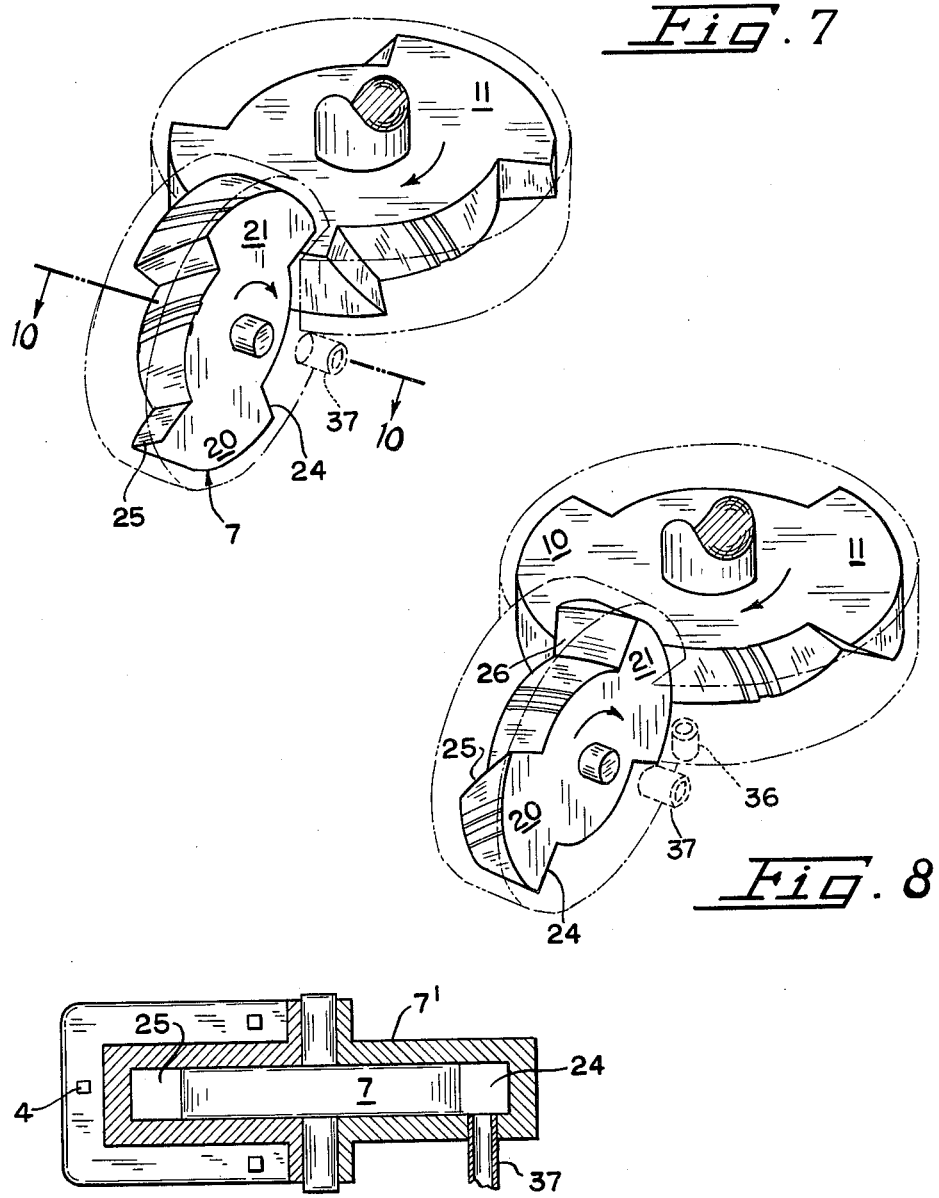
FIG. 10 is a cross-section view on line 10—10 of FIG. 7 but showing the casing in full lines as in FIG. 1.

Referring in more detail to the drawings FIG. 1 shows a positive displacement type energy converting device comprising a casing indicated generally at 1. Casing 1 includes upper and lower sections 2 and 3 each having a peripheral rim, and the sections are joined together by bolts 4 which are threaded in the rim on section 3. The central portion of the casing is recessed to receive a power disk 6 in rotary sealing engagement. See FIGS. 4 and 9. For reference purposes, the three radial portions of the casing are numbered 7', 8' and 9'. Each of these radial portions is recessed to receive an abutment disk in rotary sealing engagement, the abutment disk in radial portion 7' being designated by the reference number 7. See FIGS. 7 and 10, recalling that the entire FIG. 7 has been rotated about 90° clockwise from FIG. 1.

The power disk 6 has two projections or large radius sections 10, 11 and two recessed portions or small radius sections 12, 13. In particular, see FIG. 2. The large and small radius sections meet at beveled edges 14–17. Similarly, each of the abutment disks, such as the one shown at 7, has two projections or large radius sections 20, 21, and two recessed portions or small radius sections 22, 23. These large and small radius sections meet at beveled edges 24–27. The power and abutment disks rotate in synchronism and have their peripheral surfaces in sealing engagement throughout the rotation. Various conventional gearing means can be employed to insure synchronous rotation so that the large radius sections of the power disk will engage the small radius sections of the abutment disks and vice versa. However, the preferred gearing means consists of gear teeth 30 on the power disk meshing with gear teeth 31 on the abutment disks. Although for simplicity the gear teeth are only shown along a portion of the disks, it will be understood that the teeth are continuous along the periphery of both the large and small radius portions of each disk. The power disk is mounted on a shaft 32 and the abutment disks are mounted on shafts 33. The casing 1 is provided with inlet lines 35 and outlet lines 36 for the power disk, and inlet lines 37 and outlet lines 38 for the abutment disks. These lines can be brazed or welded in place in the casing.

The device shown in the drawings can operate as a compressor or as a fluid motor. The term compressor as used herein is intended to include operation as a pump where the fluid being handled is non-compressible.

*Operation as a fluid motor*

In order to operate the device as a fluid motor, a source of high pressure fluid is connected to the inlet lines 35 and power is extracted from the shaft 32. The high pressure fluid can be channeled to the inlet lines 35 by means of a manifold such as is indicated schematically at 39 in FIG. 1. As shown best in FIGS. 2, 3, 4 and 9, an expansion chamber 40 is created between beveled edge 16 and abutment disk 7. As will be understood by those skilled in the art, a similar expansion chamber will be formed when beveled edge 14 passes abutment disk 7, and the same situation obtains for each of the other abutment disks in casing portions 8' and 9'. Although the device will work with only one abutment disk, more are preferred for smoother operation.

Referring now to FIGS. 2–4 in sequence it will be seen that as the abutment disk 6 is moved clockwise to the position in FIG. 2, the inlet line 35 is uncovered by beveled edge 16, whereas line 35 had previously been closed by the upper face of the large radius section 11. As soon as the inlet line is uncovered, high pressure fluid enters chamber 40 and drives the abutment disk clockwise until beveled edge 17 reaches the inlet line and closes off the end of the line. The fluid which entered chamber 40 is now trapped between the two beveled edges 16 and 17 and is carried around with disk 6 until the next abutment disk enters the recessed portion 12. At this time a compression chamber such as chamber 41 in FIG. 2 will be formed between beveled edge 17 and the abutment disk it is approaching. When this occurs, the trapped fluid will be exhausted or forced out of one of the outlet lines 36 as edge 17 approaches said next abutment disk. Thus in FIG. 1, the fluid would be forced out of the outlet line 36 adjacent the abutment disk in the radial casing 9'. The heavy line 43 in FIG. 1 represents the fluid flow path between abutment casing 7' and 9'. A similar flow path occurs between abutment disk casings 9' and 8', and between 8' and 7'. This operation is not claimed as new in this invention and is also described in my copending application Serial No. 127,431.

One contribution of this invention as regards fluid motor operation is to employ the abutment disks as additional work producing members for high power, or as self-driving members for high efficiency. In either event fluid under pressure is connected to the abutment disk inlet lines 37. Since the rotation of the abutment disks occurs in the same way regardless of the source of high pressure fluid, the rotational operation of the abutment disks will first be explained without referring to any particular supply of high pressure driving fluid.

Figure 6:
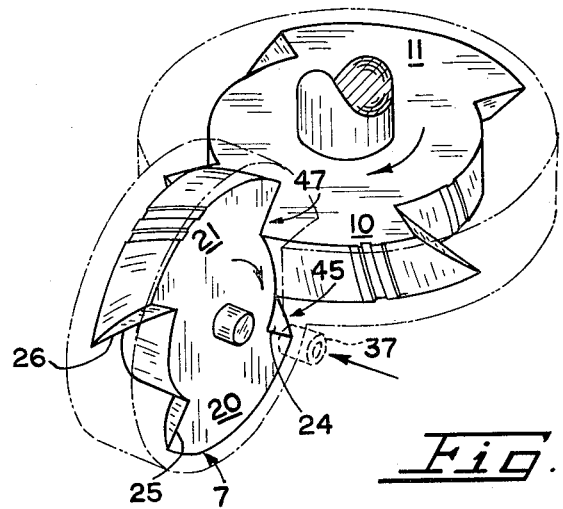

Reference is now made to FIGS. 4–8 in sequence, again recalling that the entire device in FIGS. 5–8 has been rotated about 90° clockwise from FIG. 4 in order to show the inlet side of the abutment disk 7. In the position shown in FIG. 5, the inlet passage 37 is closed by the face of the large radius section 20 on abutment disk. In FIGURE 6 the inlet passage has just been opened by the beveled edge 24. High pressure fluid is thus admitted to an expansion chamber 45 formed between edge 24 and the large radius section 10 on power disk 6. High pressure fluid will now drive the abutment disk in the direction shown by the arrows in FIGS 5–8. When beveled edge 27 reaches inlet passage 37, the inlet will be closed off by the face of large radius section 21. This closing condition is just about to occur in the position shown in FIG. 8. Thereafter, the fluid trapped between edges 24 and 27 will be carried around with disk 7 until the large radius section 10 of the power disk 6 enters the recessed portion 23 of the abutment disk. This condition can be seen to be about to begin in FIG. 4 and continuing through FIG. 6. When the large radius section 10 enters the recessed portion 23, the beveled edge 24 uncovers the outlet passage 38 FIG. 4 so that the trapped fluid will be forced out or exhausted as beveled edge 27 moves toward the large radius section 10 and forms a compression chamber 47 as indicated for example in FIG. 6. Obviously the abutment disk cycle just described will be repeated when beveled edge 26 comes around to open the inlet passage 37.

The alternative fluid pressure sources and valving system for the abutment disks will now be described. As shown in FIG. 1, a pump such as centrifugal pump 50 is connected to shaft 32. The pump has an outlet line 51 which is connected to one side of a two way valve 52. A branch line 53 from the high pressure source which feeds the abutment disk is connected to the other side of valve 52. A manifold 54 is also connected to valve 52. As is shown schematically in FIG. 1, the manifold 54 is also connected to the inlet lines 37 of the abutment disks. Pump 50 has an inlet line 55 connected to a valve 56. Valves 52 and 56 are preferably operated in unison and any conventional control linkage can be used for this purpose. As shown schematically in FIG. 1, valves 52 and 56 can be provided with control arms 57 and 58, respectively, with a connecting rod 59 pivotally joined to the two control arms. Thus, when the valves are in the position shown in FIG. 1, the inlet manifold 54 is connected to the output of the centrifugal pump 50. When valve 52 is rotated clockwise 90° it will obviously connect manifold 54 with branch line 53 from the high pressure source which continually feeds the power disk. At the same time valve 52 is rotated, link 59 will cause valve 56 to rotate 90° clockwise and thus close the inlet line 55 for the pump 50.

It will be noted that pump 50 is connected to power disk shaft 32 so that the pump will rotate in synchronism with the power disk. Although a direct connection between shaft 32 and pump 50 is preferred because of its simplicity, the pump can be geared up or down from the shaft as long as they rotate in synchronism. As will be understood by those skilled in the art, the power required to drive the abutment disks in synchronism with the power disk will vary in proportion to the speed of the power disk. The size of the pump 50 is selected so that the pump output is substantially the same as the fluid inlet required to drive the abutment disks in synchronism with the power disk. The match between pump outlet and required abutment disk inlet need not be exact because the gear drive between the power and abutment disks is relied upon to insure exactly synchronous rotation of all the disks. The sole purpose of pump 50 is to provide a fluid pressure source which will drive the abutment disks and substantially relieve the gear teeth on the disks from this part of their function. This feature is important because the angle-gear drive between the power and abutment disks is relatively inefficient compared to the direct fluid drive by the pump 50.

In terms of operation, the fluid motor 1 will have optimum efficiency with the valves 52 and 56 in the positions shown. The operation can be changed from maximum efficiency to maximum power simply by rotating the valves 90° clockwise as previously described. When the valves are positioned for maximum power the fluid in line 53 from the high pressure source will drive the abutment disk. The high pressure source will normally deliver much higher pressure than the pressure which pump 50 delivers for the purpose of simply making the abutment disks self-rotating. Thus, when the power and abutment disks are connected to the same high pressure source, the abutment disks will deliver power to the power disk and thereby add to the power which the power disk 6 delivers to the power take-off shaft 32. In addition to increasing the total output power of the fluid motor, the use of the abutment disks as auxiliary power disks smooths the output and decreases the required size of any flywheel that may be used. Thus, it is possible to obtain a relatively smooth power delivery with only one abutment disk. For example, if the single abutment disk has the same size as the power disk, half of the power is delivered alternately by each of the disks. The power disk, being connected to the power take-off shaft 32, delivers its power directly to the shaft and the abutment disk delivers its power to the power take-off shaft via the power disk through the interconnecting gears on the two disks. It should be understood that the inlet line 53 for the abutment disks could of course be connected to a high pressure source different from the high pressure source which feeds the inlet manifold 39 for the power disk.

*Operation as a compressor*

Figure 11:
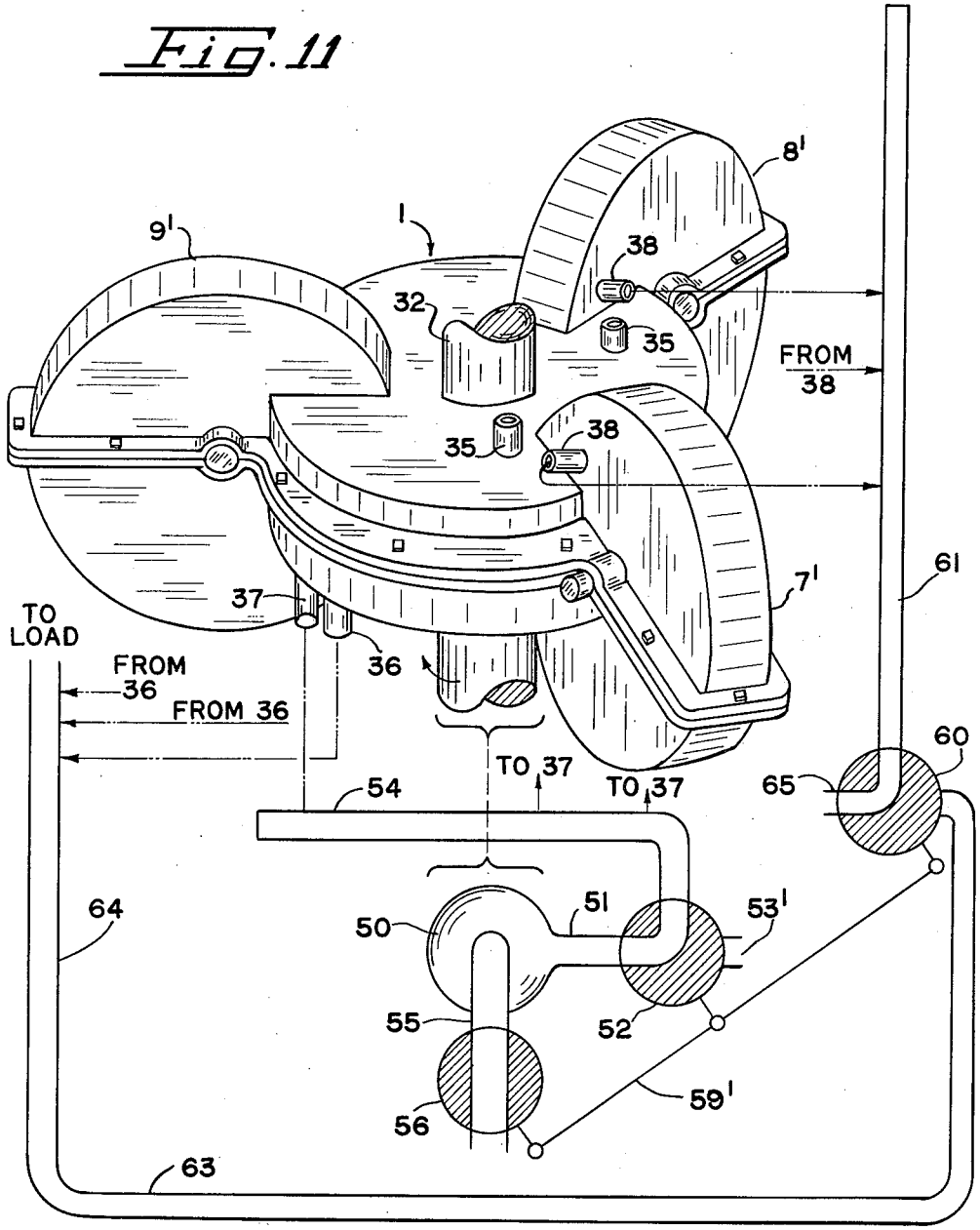
FIG. 11 is a perspective view of the same device as in FIG. 1 but showing a schematic view of a valving arrangement which can be employed when the device is used as a compressor.

The positive displacement energy converting device 1 described in connection with FIGS. 1–10 can be employed as a high volume compressor without any structural change in the device. FIGURE 11 shows the device employed as a compressor. The main difference between the motor and compressor operation is that in the former, high pressure fluid is admitted to the device and power is taken off of shaft 32, while in the latter power is delivered to shaft 32 and fluid under pressure is delivered from the outlet lines of the device. Operation as a compressor will be obvious to those skilled in the art as being exactly the same as the previously described operation as a fluid motor except that the outlet lines 36 and 38 deliver fluid under pressure and the inlet lines 35 and 37 admit fluid at some lower pressure, such as atmospheric pressure. Thus, assuming rotation of the disks in the direction shown in FIGS. 2–8, the expansion chambers 40 and 45 FIGS. 2 and 6 will still be expansion chambers, the difference being that in compressor operation the expansion chambers will serve to pull in fluid at low pressure instead of being driven by high pressure fluid. Similarly, the compression chambers 41 and 47 FIGS. 2 and 6 will still be compression chambers, the difference being that in compressor operation the compression chambers will deliver into a load instead of delivering into atmospheric or other low pressure.

FIG. 11 shows the positive displacement device 1 together with a schematic showing of a valving arrangement suitable for compressor operation. As in the case of fluid motor operation shown in FIG. 1, the compressor operation can employ a centrifugal pump 50 and valves 56 and 52. The pump and valving arrangement is the same as in FIG. 1 except that valve 52 is connected to the atmosphere by line 53' instead of to the high pressure branch line 53. In addition FIG. 11 shows an additional two-way valve 60. Valve 60 is connected to an outlet manifold 61 connected to the three outlet lines 38 from the abutment disk casings 7', 8' and 9'. In addition valve 60 has a connection 65 to atmosphere, as well as a connection to a branch line 63 of an outlet manifold 64 which is fed by the three outlet lines 36 of the power disk. The three valves 52, 56 and 60 are preferably interconnected for operation in unison by means of the connecting rod 59'.

In terms of operation, the valves can be adjusted for maximum efficiency or maximum output. When the valves are in the position shown in FIG. 11, the device will operate at maximum efficiency because the abutment disks will be at least partly self rotated by the delivery from pump 50, and the abutment disks will do substantially no work because their outlet lines 38 are connected to atmospheric pressure. When the three valves are rotated 90° clockwise the operation will obviously be changed to maximum output because the outlet manifold 61 from the abutment disks will be connected to the main outlet manifold 64. The inlet manifold 54 for the abutment disks will be connected to atmosphere, and the inlet to the pump will be closed so the pump will idle. An even greater output can be obtained by removing rod 59' so that valves 52 and 56 will remain as shown in FIG. 11 when valve 60 is rotated. With this arrangement the inlet to the abutment disks will be precompressed by pump 50 and thus increase the output of the abutment disks. In addition, the outlet branch line 63 could of course be connected to deliver to a different load than the load fed by manifold 64 from the power disk.

*Operation as a power generating device*

Figure 12:
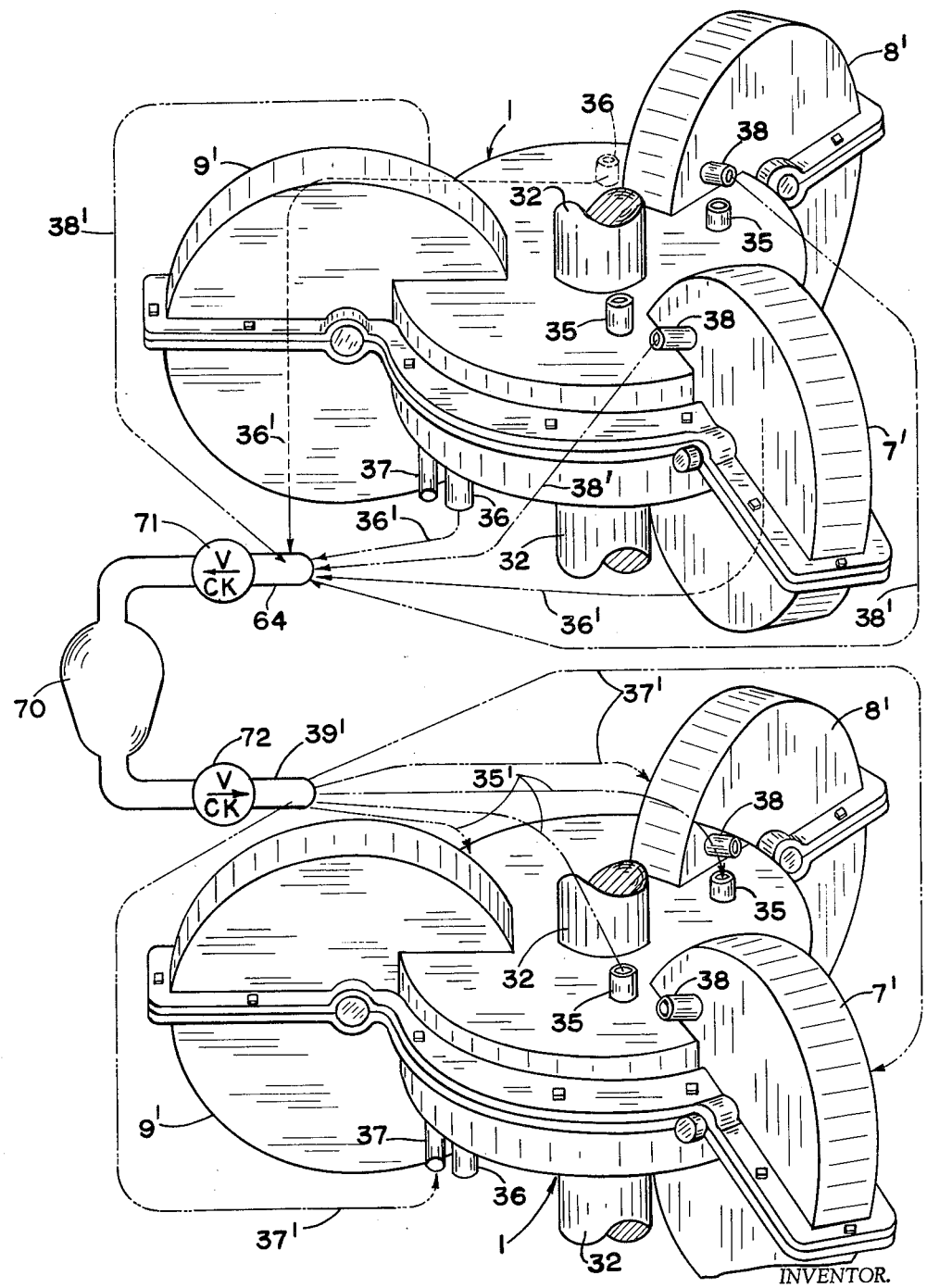
FIG. 12 is a perspective view similar to FIG. 1 but showing two of the energy converting devices connected together.

FIG. 12 shows two energy converting devices 1 mounted in tandem with the top unit operating as a compressor and the bottom unit operating as a fluid motor. Output lines 36 of the compressor unit power disk are connected by lines 36' to an outlet manifold 64', and outlet lines 38 of the compressor unit abutment disks are connected also to manifold 64' by lines 38'. The manifold 64' delivers to a combustion chamber 70, preferably through a check valve 71. Chamber 70 is provided with a conventional continuous burner (not shown) and a fuel inlet line (not shown). Alternatively to the fuel line, the compressor unit can be used to compress a fuel mixture instead of pure air. Combustion chamber 70 delivers to a high pressure manifold 39' which preferably contains a check valve 72. Manifold 39' delivers high pressure fluid to the inlet lines 35 of the power disk in the motor unit by means of lines 35'. Manifold 39' also delivers high pressure fluid to the inlet lines 37 of the abutment disks by means of lines 37'. The shafts 32 of the two units can be directly connected in a straight drive or the compressor unit can be geared up or down from the motor unit, but in any event the motor unit drives the compressor unit. Obviously, centrifugal pumps and valving such as shown in FIGS. 1 and 11 can be connected to the motor and compressor units, respectively, in FIG. 12 to permit selective adjustment between maximum power and maximum efficiency.

Further, it should be understood that the outlet lines 38 of abutment disks of the compression unit in FIG. 12 can simply be disconnected from the combustion chamber and allowed to exhaust to atmosphere. Also, it should be understood that in FIG. 1 the centrifugal pump and valves can be omitted. In which case all of the inlet lines for all of the disks would be permanently connected to a high pressure source. Similarly, in FIG. 11 the centrifugal pump and valves can be omitted. In which case the outlet lines for the abutment disks would be connected to the same load as the power disk outlet lines or to a different load.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. In a positive displacement rotary compressor of the type comprising a casing, a power disk rotatably mounted in said casing, at least one abutment disk rotatably mounted in said casing at an angle to said power disk with the outer portion of said abutment disk being in sealed association with the outer portion of said power disk during rotation of the disks, said power and abutment disks each having at least one projection and at least one recessed portion adjacent their peripheries, means for rotating said disks in synchronism with said projections and recesses on the power disk meshing with those on the abutment disk whereby at least one compression and at least one expansion chamber are formed by each of the power and abutment disks during rotation, an inlet passage to the expansion chamber formed by the abutment disk, an outlet passage for the compression chamber formed by the abutment disk, and an outlet passage for the compression chamber formed by the power disk, the improvement comprising an inlet passage to the expansion chamber formed by the power disk and separate from said outlet passage for the abutment disk, and means for supplying fluid under pressure to the inlet passage of said abutment disk in proportion to the speed of said power disk.

2. In the positive displacement rotary compressor of claim 1 the further improvement comprising valve means for selectively connecting said inlet passage of the abutment disk alternatively to said proportional pressure supplying means and to the atmosphere.

3. In a positive displacement rotary compressor of the type comprising a casing, a power disk rotatably mounted in said casing, at least one abutment disk rotatably mounted in said casing at an angle to said power disk with the outer portion of said abutment disk being in sealed association with the outer portion of said power disk during rotation of the disks, said power and abutment disks each having at least one projection and at least one recessed portion adjacent their peripheries, means for rotating said disks in synchronism with said projections and recesses on the power disk meshing with those on the abutment disk whereby at least one compression and at least one expansion chamber are formed by each of the power and abutment disks during rotation, an inlet passage to the expansion chamber formed by the abutment disk, and outlet passage for the compression chamber formed by the abutment disk, and an outlet passage for the compression chamber formed by the power disk; the improvement comprising an inlet passage to the expansion chamber formed by the power disk and separate from said outlet passage for the abutment disk, means for supplying fluid under pressure to the inlet passage of said abutment disk in proportion to the speed of said power disk, and valve means for selectively connecting said outlet passage of the abutment disk alternatively to the atmosphere and to a load.

4. In a positive displacement rotary compressor of the type comprising a casing, a power disk rotatably mounted in said casing, at least one abutment disk rotatably mounted in said casing at an angle to said power disk with the outer portion of said abutment disk being in sealed association with the outer portion of said power disk during rotation of the disks, said power and abutment disks each having at least one projection and at least one recessed portion adjacent their peripheries, means for rotating said disks in synchronism with said projections and recesses on the power disk meshing with those on the abutment disk whereby at least one compression and at least one expansion chamber are formed by each of the power and abutment disks during rotation, an inlet passage to the expansion chamber formed by the abutment disk, an outlet passage for the compression chamber formed by the abutment disk, and an outlet passage for the compression chamber formed by the power disk; the improvement comprising an inlet passage to the expansion chamber formed by the power disk and separate from said outlet passage for the abutment disk, means for supplying fluid under pressure to the inlet pasage of said abutment disk in proportion to the speed of said power disk, valve means for selectively connecting said outlet passage of the abutment disk alternatively to the atmosphere and to a load, and valve means for selectively connecting said inlet passage of the abutment disk alternatively to said proportional pressure supplying means and to the atmosphere.

5. In a positive displacement rotary fluid motor of the type comprising a casing, a power disk rotatably mounted in said casing, at least one abutment disk rotatably mounted in said casing at an angle to said power disk with the outer portion of said abutment disk being in sealed association with the outer portion of said power disk during rotation of the disks, said power and abutment disks each having at least one projection and at least one recessed portion adjacent their peripheries, means for rotating said disks in synchronism with said projections and recesses on the power disk meshing with those on the abutment disk whereby at least one compression and at least one expansion chamber are formed by each of the power and abutment disks during rotation, an inlet passage to the expansion chamber formed by the abutment disk, and an outlet passage for the compression chamber formed by the power disk; the improvement comprising an inlet passage to the expansion chamber formed by the power disk and separate from said outlet passage for the abutment disk, and means for supplying fluid under pressure to the inlet passage of said abutment disk in proportion to the speed of said power disk.

6. In a positive displacement rotary fluid motor of the type comprising a casing, a power disk rotatably mounted in said casing, at least one abutment disk rotatably mounted in said casing at an angle to said power disk with the outer portion of said abutment disk being in sealed association with the outer portion of said power disk during rotation of the disks, said power and abutment disks each having at least one projection and at least one recessed portion adjacent ther peripheries, means for rotating said disks in synchronism with said projections and recesses on the power disk meshing with those on the abutment disk whereby at least one compression and at least one expansion chamber are formed by each of the power and abutment disks during rotation, an inlet passage to the expansion chamber formed by the abutment disk, an outlet passage for the compression chamber formed by the abutment disk, and an outlet passage for the compression chamber formed by the power disk; the improvement comprising an inlet passage to the expansion chamber formed by the power disk and separate from said outlet passage for the abutment disk, means for supplying fluid under pressure to the inlet passage of said abutment disk in proportion to the speed of said power disk, means for supplying high pressure fluid to said inlet passage for the power disk, and valve means for selectively connecting said inlet passage of the abutment disk alternatively to said proportional pressure supplying means and to said means for supplying high pressure fluid.

References Cited by the Examiner

UNITED STATES PATENTS

| | | | |
|---|---|---|---|
| 1,147,428 | 7/15 | Peterson | 123—8 |
| 2,213,939 | 9/40 | Jendrossik | 60—39.75 |
| 2,215,756 | 9/40 | Heinrich et al. | 103—5 |
| 2,251,664 | 8/41 | Davis | 60—52 |
| 2,373,304 | 4/45 | Garbeth | 123—8 |
| 2,493,873 | 1/50 | Hill | 60—39.75 |
| 2,643,613 | 6/53 | Westbury et al. | 103—5 |
| 2,674,982 | 4/54 | McCall | 123—13 |
| 2,714,288 | 8/55 | Davis | 60—52 |

KARL J. ALBRECHT, *Primary Examiner.*

RALPH H. BRAUNER, JOSEPH H. BRANSON, JR.,
*Examiners.*